(12) United States Patent
Sheldon et al.

(10) Patent No.: US 9,772,508 B2
(45) Date of Patent: Sep. 26, 2017

(54) FLEXIBLE NOSE PIECE FOR EYEWEAR

(71) Applicant: Brent Sheldon, Miami Beach, FL (US)

(72) Inventors: Brent Sheldon, Miami Beach, FL (US); Thomas Rouayroux, Montreal (CA); Antoine Dallaire, Montreal (CA)

(73) Assignee: Brent Sheldon, Miami Beach, FL (US)

( * ) Notice: Subject to any disclaimer, the term of this patent is extended or adjusted under 35 U.S.C. 154(b) by 45 days.

(21) Appl. No.: 14/638,618

(22) Filed: Mar. 4, 2015

(65) Prior Publication Data

US 2016/0259179 A1   Sep. 8, 2016

(51) Int. Cl.
| G02C 5/12 | (2006.01) |
| B29C 45/00 | (2006.01) |
| G02C 5/02 | (2006.01) |
| B29D 12/00 | (2006.01) |

(52) U.S. Cl.
CPC .......... *G02C 5/122* (2013.01); *B29C 45/0003* (2013.01); *G02C 5/02* (2013.01); *G02C 5/126* (2013.01); *B29D 12/00* (2013.01)

(58) Field of Classification Search
CPC ...... G02C 5/122; G02C 5/02; B29C 45/0003; B29D 12/00
USPC .......................................................... 351/131
See application file for complete search history.

(56) References Cited

U.S. PATENT DOCUMENTS

| 3,744,888 A | 7/1973 | Bogyos |
| 4,190,334 A | 2/1980 | O'Neil |
| 4,405,214 A | 9/1983 | Bolle |
| 5,266,978 A | 11/1993 | Kaszmann et al. |
| 5,345,616 A | 9/1994 | Wiedner |
| 5,581,312 A | 12/1996 | Chen |
| 5,737,055 A | 4/1998 | Dittmeier |
| 6,517,202 B2 | 2/2003 | Huang |
| 7,472,991 B1 | 1/2009 | Chen |
| 7,631,967 B1 | 12/2009 | Huang |
| 8,083,344 B2 * | 12/2011 | Blanshay ................. G02C 9/00 2/436 |
| 2007/0109490 A1 * | 5/2007 | Collier ..................... G02C 5/12 351/41 |
| 2013/0107199 A1 | 5/2013 | Chen |

(Continued)

FOREIGN PATENT DOCUMENTS

| EP | 0 171 461 A2 | 2/1986 |
| EP | 2 284 598 A1 | 2/2011 |

OTHER PUBLICATIONS

International Search Report and Written Opinion for PCT/US2016/019544 dated Jun. 30, 2016, 15 pages.

*Primary Examiner* — Bumsuk Won
*Assistant Examiner* — Grant Gagnon
(74) *Attorney, Agent, or Firm* — Klintworth & Rozenblat IP LLP

(57) ABSTRACT

A flexible nose piece structure for eyewear according to one embodiment, includes a base structure having a pair of nose piece bodies defining grooves on the respective front end and outer side thereof. The nose piece structure further includes a soft and flexible comfort piece having a pair of nose pads attached to an inner side and filling elements received in the grooves of the respective nose piece bodies. Therefore, the nose piece structure provides comfort and multiple flexibilities for self-adjustment while maintaining enough rigidity to provide a stable configuration.

20 Claims, 5 Drawing Sheets

(56) References Cited

U.S. PATENT DOCUMENTS

2014/0375948 A1* 12/2014 Chen ..................... G02C 5/124
351/137

* cited by examiner

FLEXIBLE NOSE PIECE FOR EYEWEAR

TECHNICAL FIELD

The application relates generally to eyewear, and more particularly to a flexible nose piece structure for eyewear.

BACKGROUND OF THE ART

An eyewear frame structure conventionally includes a nose piece such that the eyewear is supported on the bridge of the nose. A conventional nose piece may be an integral part of the frame or may be in the form of pads fixed or on a swivel to provide some self-adjustment between the frames and a user's nose. A nose piece must be configured to be suitably supported on the user's nose bridge to prevent the eyewear from slipping down the user's nose and to provide comfort, particularly after being worn for a long period of time. However, most conventional nose pieces for eyewear are less than satisfactory because they cannot be adjusted as to width and height with the result that, unless the eyewear are fitted properly and exactly at the outset, there is very little that can be done to correct for a poor fit. Efforts have been made to improve the comfort and to provide some form of adjustability for eyewear. Such efforts to develop improved nose pieces for eyewear continue, particularly with modern eyewear designs.

Accordingly, there is a need for improved nose piece structures for eyewear.

SUMMARY

In one aspect, there is provided a flexible nose piece structure for eyewear, comprising: a base structure including a connector for attachment to a frame structure of the eyewear and a pair of nose piece bodies divergently and downwardly extending from the connector to a bottom end of the respective nose piece bodies, each of the nose piece bodies having opposed outer and inner sides extending between a front end and a rear end thereof, each of the nose piece bodies defining a plurality of first grooves on the outer side thereof and a plurality of second grooves on the front end; and a comfort piece including a pair of nose pads attached to the inner sides of the respective nose piece bodies and a plurality of filling elements received in the respective first and second grooves, the comfort piece being soft and flexible relative to the base structure.

In another aspect, there is provided a method of making a nose piece structure for eyewear, comprising steps of: a) molding a base structure in a first molding procedure using a first molding material, the base structure including a connector for attachment to a frame structure of the eyewear and a pair of nose piece bodies divergently and downwardly extending from the connector to a bottom end of the respective nose piece bodies, each of the nose piece bodies having opposed outer and inner sides extending between a front end and a rear end thereof, each of the nose piece bodies defining a plurality of first grooves on the outer side thereof and a plurality of second grooves on the front end; and b) molding a comfort piece in a second molding procedure using a second molding material with the presence of the base structure, to produce a pair of nose pads attached to the inner sides of the respective nose piece bodies and a plurality of filling elements received in the respective first and second grooves, the second molding material in a cured condition being soft and flexible relative to the first molding material.

DESCRIPTION OF THE DRAWINGS

Reference is now made to the accompanying drawings in which.

It will be noted that throughout the appended drawings, like features are identified by like reference numerals.

It should also be noted that throughout the following description and claims, the terms "front" and "rear" refer to directions from the perspective of the user—i.e. further away from the user's face is referred to as "front" and closer to the user's face is referred to as "rear".

DETAILED DESCRIPTION

Figure 1:
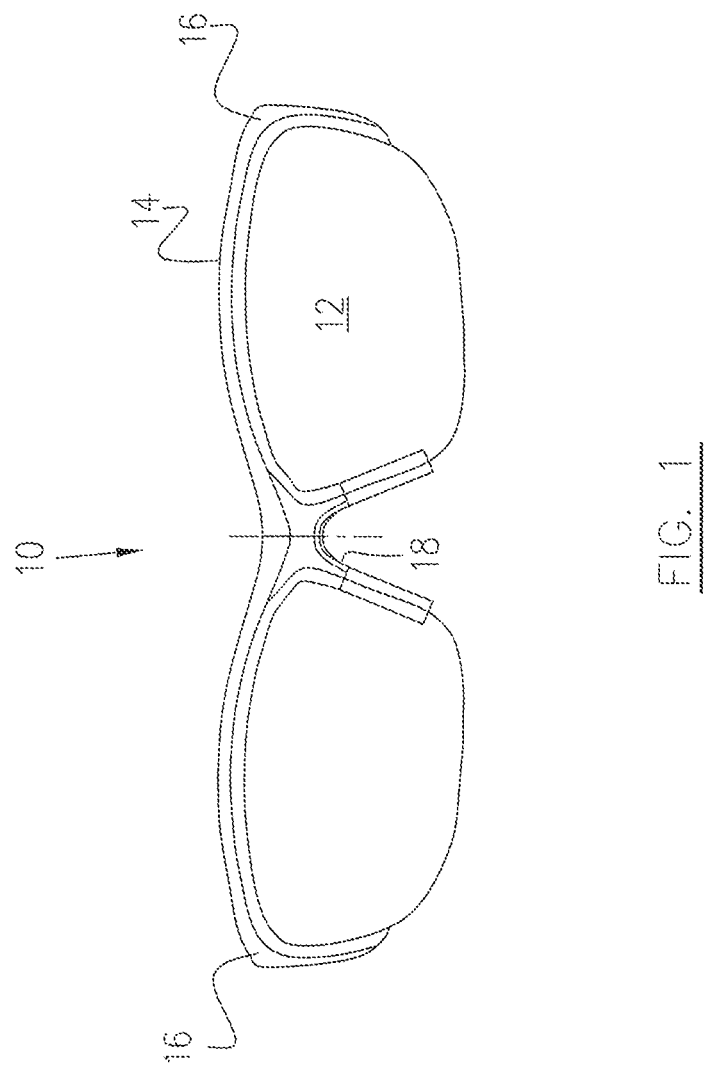
FIG. 1 is a front elevational view of eyeglasses according to one embodiment.

FIG. 1 illustrates eyewear such as eyeglasses 10 which may include one or two lenses 12 attached to a frame structure 14. The frame structure 14 according to one embodiment may be formed with an upper member (not numbered) extending between opposed side ends 16 and may be integrated with a nose piece structure 18 which is connected to a central portion of the upper member of the frame structure 14.

Referring to FIGS. 1-7, the nose piece structure 13 according to one embodiment may include a base structure 20 and a comfort piece 22 attached thereto. The base structure 20 may include a connector 24 for attachment to the frame structure 14 and a pair of nose piece bodies 26 extending divergently and downwardly from the connector 24 to a respective bottom end 28 of the nose piece body 26. Each nose piece body 26 may have opposed outer and inner sides 30, 32 extending between a front end 34 and a rear end 36.

Figure 6:
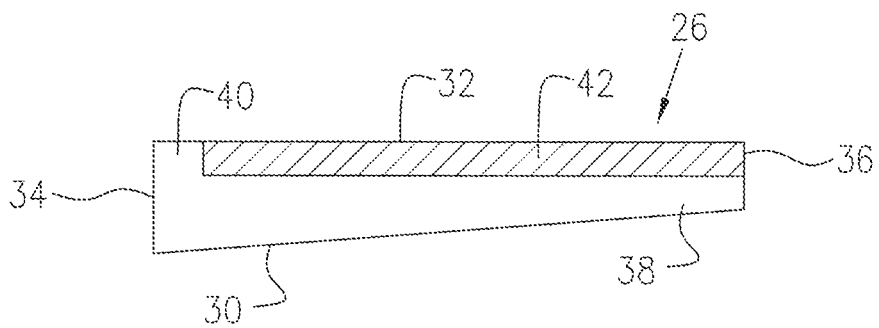
FIG. 6 is a cross-sectional view of the nose piece body taken along line 6-6 in FIG. 3, showing a cross-section having grooves defined in the respective outer side and front end of the nose piece body.
Figure 7:
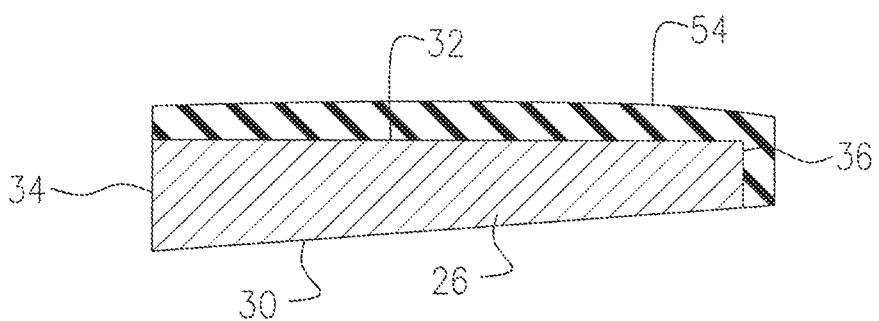
FIG. 7 is a cross sectional view of the nose piece body taken along line 7-7 in FIG. 2, showing a cross-section without the grooves.

Each nose piece body 26 may have a dimension defined between the outer and inner sides 30, 32 (the thickness of the nose piece body) smaller than a dimension defined between the front and rear ends 34, 36 (the width of the nose piece body), as more clearly shown in FIGS. 6 and 7. The dimension defined between the outer and inner sides 30, 32 according to one embodiment may also diminish from the front end 34 to the rear end 36.

Each nose piece body 26 may define a first group of grooves 38 on the outside 30 which extend through the respective nose piece body 26 between the front and rear ends 34, 36 thereof. Optionally, the grooves 38 may be positioned parallel one with another. A second group of grooves 40 may be defined on the front end 34 of each nose piece body 26, extending through the nose piece body 26 between the outer and inner sides 30, 32. Optionally, the grooves 40 may be positioned parallel one with another. The grooves 40 meet the respective grooves 38 at a corner (not numbered) between the front end 34 and the outside 30 of each nose piece body 26 and therefore each groove 40 is in communication with a corresponding groove 38, as more clearly shown in FIG. 6 Optionally, the depth of the respective grooves 38 may vary in accordance with the diminishing thickness of the nose piece body 26 from the front end 34 to the rear end 36 thereof, thereby resulting in a respective bottom wall 42 of the groove 38 having a consistent thickness. The thickness of the bottom wall 42 of the respective grooves 38 may be substantially identical. It should be noted that the bottom walls 42 of the grooves 33 are part of the nose piece body 26 and therefore partially define the inner side 32 of the nose piece body 26.

The base structure 20 according to one embodiment may further include a bridge 44 which forms a joint (not numbered) connecting the connector 24 and the nose piece bodies 26. The bridge 44 may define a concave bottom surface 46 extending downwardly and divergently toward the respective inner sides 32 of the nose piece bodies 26. The bridge 44 may define a convex top surface 48 extending downwardly and divergently toward the respective outer surfaces 30 of the nose piece bodies 26. The bridge may be affixed to a rear side of the connector 24 at a lower location of the connector 24. The connector 24 may be configured in various shapes in accordance with the frame structure 14 to which the nose piece structure 18 is attached. The bridge 44 may further define a flat rear surface 50 extending in a substantially vertical direction between the convex top surface 48 and the concave bottom surface 46. The rear surface 50 and the respective rear end 36 of the nose pieces bodies 26 may in combination define a shoulder 52 therebetween.

The base structure 20 may be made of a relatively rigid material such as a rigid plastic material and the comfort piece 22 may be made of a soft and flexible material such as rubber, such that the comfort piece 22 is soft and flexible relative to the rigid material of the base structure 20.

The comfort piece 22 according to one embodiment may include a pair of nose pads 54 attached to the inner sides 32 of the respective nose piece bodies 26, and may optionally wrap around and cover the entire inner side 32 and the rear end 36 of the respective nose piece bodies 26 (see FIG. 7). The comfort piece 22 may further include a plurality of filling elements 56, 58 received in the respective grooves 38, 40 of each nose piece body 26. As described above, each groove 40 is in communication with a corresponding groove 38 at the corner between the front end 34 and the outside 30 of the nose piece body 26. Therefore, each filling element 58 may join a corresponding filling element 56 such as at the corner of the nose piece body 26. Each filing element 56 may join the nose pad 54 at the rear end 36 of the nose piece body 26 and each filling element 58 may join the nose pad 54 at the front end 34. Therefore, in the cross-section of the nose piece body 26 extending through both a groove 38 and a groove 40, the nose pad 54 and the filling element 56 with a corresponding filling element 58 in combination surround the nose piece body 26 (which is the bottom wall 42 of the groove in this cross-section), as illustrated in FIG. 5.

Figure 2:
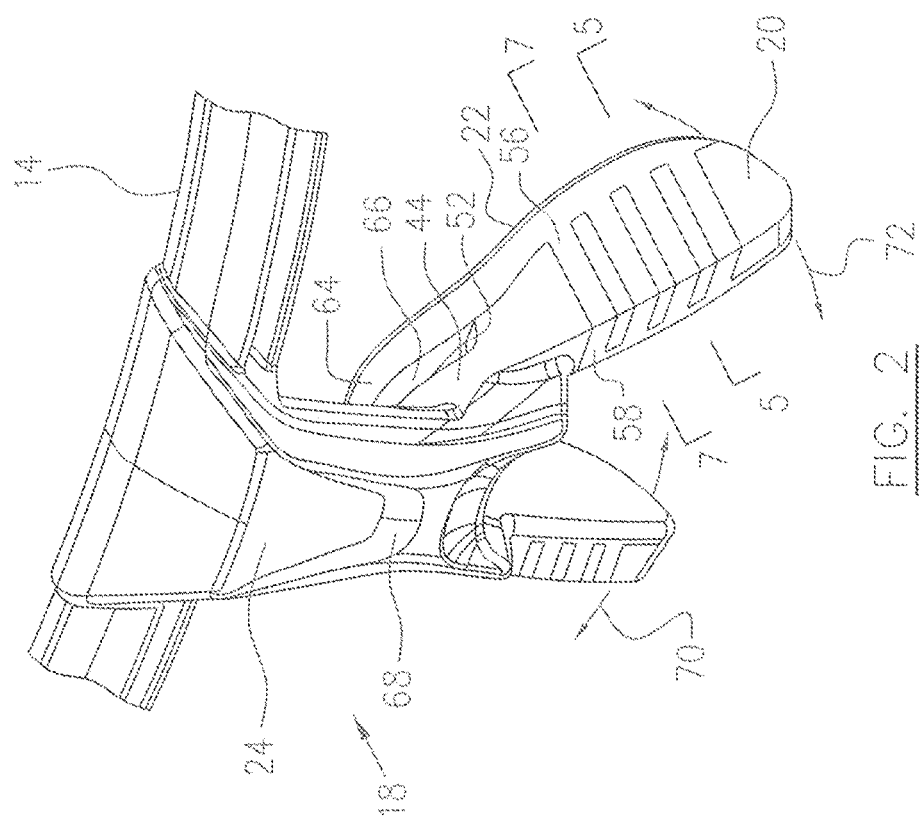
FIG. 2 is a front perspective view of a nose piece structure integrated with a frame structure which is partially shown and used in the eyeglasses of FIG. 1, showing a base structure with a comfort piece attached thereto, according to one embodiment.
Figure 3:
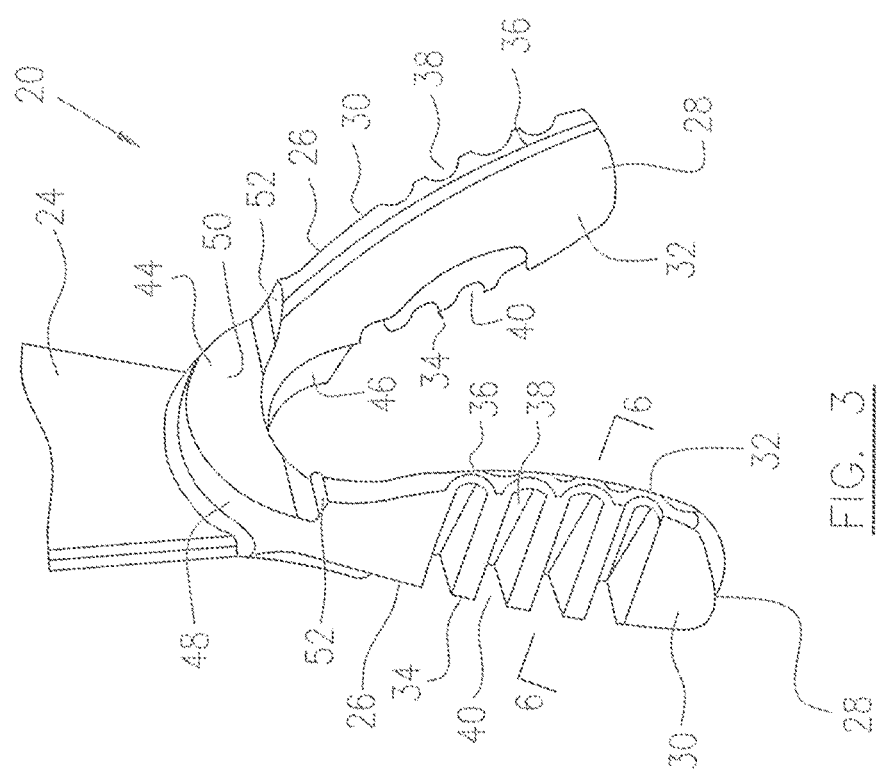
FIG. 3 is a rear perspective view of the base structure of FIG. 2, showing a plurality of grooves defined in respective nose piece bodies.
Figure 4:
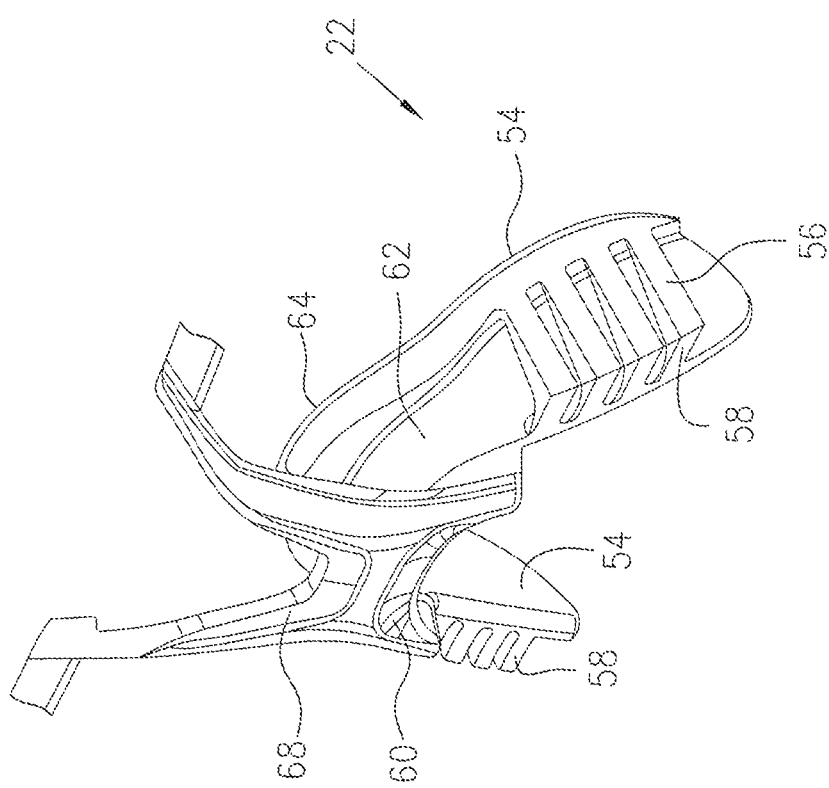
FIG. 4 is a front perspective view of the comfort piece used in the nose piece structure of FIG. 2, showing a pair of nose pads with filling elements.
Figure 5:
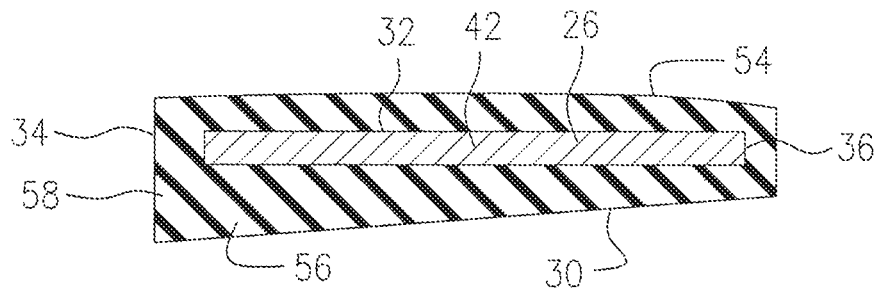
FIG. 5 is a cross-sectional view of the nose piece structure taken along line 5-5 in FIG. 2, showing in this cross-section, the nose pad and filling elements joining together to surround the nose piece body.

The filling elements 56, 58 may be configured in accordance with the respective grooves 38, 40 to fully fill the respective grooves 38, 40 such that the filling elements 56, 58 are substantially flush with the respective outer side 30 and front side 34 of each nose piece body 26, as illustrated in FIGS. 2 and 5.

The comfort piece 22 according to one embodiment may further include a center piece 60 including a curved pad 62 attached to the concave bottom surface 46 of the bridge 44 and smoothly extending to and connecting the nose pads 54. The center piece 60 may include a back pad 64 extending upwardly from the curved pad 62 and positioned behind the bridge 44 of the base structure 20. The back pad 64 may be configured to have a profile similar to the profile of the bridge 44 of the base structure 20. The shoulder 52 in the base structure 20 may function as a spacer, resulting in a gap 66 formed between the back pad 64 and the bridge 44 (see FIG. 2). Therefore, the back pad 64 is spaced apart from the flat rear surface 50 of the bridge 44 of the base structure 20. The center piece 60 may further include a front member 68 attached to the front side of the connector 24. The front member 68 may be configured in accordance with the connector 24 to meet specific requirements for the frame structure 14 to which the nose piece structure 28 is attached.

The nose piece structure 18 may be made in molding procedures. For example, the base structure 20 may be molded in a first molding procedure using a first molding material which is relatively rigid when cured. The molded base structure 20 may include all parts and members as above-described to form an integrated one-piece component. Optionally this molding procedure of the base structure 20 may be combined with the frame structure molding procedures such that the molded base structure 20 may be integrated with (permanently attached to) the molded frame structure 14. Nevertheless, the base structure 20 may also be molded separately from the frame structure 14 and may be removably attached to the frame structure 14 by known or unknown attachment means. In a second molding procedure with the presence of the molded base structure 20, the comfort piece 22 which may include all the parts and features described above, may be molded using a second molding material which is softer and more flexible than the molding material of the base structure when cured. Due to the presence of the molded base structure 20 in this molding procedure, the comfort piece 22 may be molded over the base structure 20, resulting in suitable attachment, for example of the nose pads and curved pad to corresponding surfaces of the base structure 20. The second molding material during this molding process may fill into the respective grooves 38, 40 in the base structure 20 to form the required filling elements 56, 58. Optionally, when the base structure 20 is molded in a configuration integrated with the frame structure 14, the molding procedure of the comfort piece 22 may be conducted with the presence of the integrated frame structure 14 and the base structure 20.

The relatively rigid base structure 20 provides a suitable profile and configuration of a nose piece structure 18 generally required for eyewear. The grooved configuration in the nose piece bodies 26 and the method of joining the nose piece bodies 26 to the connector 24 advantageously provides comfort and multiple flexibilities of the nose piece structure 18 for self-adjustment while maintaining enough rigidity to provide a stable configuration. For example, the side flexion as indicated by arrows 70 and top flexion as indicated by arrows 72 (see FIG. 2), enable the nose piece structure 18 to be self-adjusting in accordance with the nose profile when supported on a nose of an individual user. The comfort piece of the soft and flexible material prevents direct contact between the respective rigid part of the nose piece structure 18 and the user's nose to provide a comfortable feeling. The back pad 64 of the comfort piece 22 is positioned behind and spaced away from the bridge 44 of the base structure 20, which advantageously enhances the top flexion (indicated by arrows 72). Furthermore, the back pad 64 in combination with the front member 68 of the relatively soft and flexible comfort piece 22 may advantageously reduce a front impact which may occur when a foreign object strikes the nose piece structure 18. The relatively soft and flexible filling elements 56, 58 received in the grooves 38, 40 may improve the appearance of the grooved configuration in an aesthetic manner without substantially compromising the multiple flexibilities of the nose piece structure 18.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A flexible nose piece structure for eyewear, comprising:
   a base structure including a connector for attachment to a frame structure of the eyewear and a pair of nose piece bodies divergently and downwardly extending from the connector to a bottom end of the respective nose piece bodies, each of the nose piece bodies having opposed outer and inner sides extending between a front end and a rear end thereof, each of the nose piece bodies defining a plurality of first grooves on the outer side thereof and a plurality of second grooves on the front end thereof, the first and second grooves communicating with each other at a forward corner of each of the nose piece bodies, the forward corner extending between the outer side and the front end; and
   a comfort piece including a pair of nose pads integrally molded to the inner sides of the respective nose piece bodies and a plurality of filling elements integrally molded within the respective first and second grooves of each of the nose piece bodies to form an integrated and inseparable one-piece component composed of the comfort piece and the nose piece bodies of the base structure, the comfort piece being soft and flexible relative to the base structure.

2. The flexible nose piece structure as defined in claim 1 wherein the nose pads of the comfort piece cover the rear end and inner side of the respective nose piece bodies.

3. The flexible nose piece structure as defined in claim 1 wherein the first and second grooves of each nose piece body extend through said nose piece body, each first groove being in communication with a respective second groove.

4. The flexible nose piece structure as defined in claim 1 wherein the filling elements received in the first and second grooves of each nose piece body are joined with one of the nose pads.

5. The flexible nose piece structure as defined in claim 1 wherein one of the filling elements received in one of the first grooves joins one of the filling elements received in one of the second grooves.

6. The flexible nose piece structure as defined in claim 1 wherein each nose piece body has a dimension defined between the outer and inner sides smaller than a dimension defined between the front and rear ends.

7. The flexible nose piece structure as defined in claim 1 wherein each nose piece body has a dimension defined between the outer and inner sides, the dimension of the nose piece body diminishing from the front end to the rear end thereof.

8. The flexible nose piece structure as defined in claim 1 wherein the first grooves in each nose piece body comprise a respective bottom wall, the bottom wall of the respective first grooves having a consistent and identical thickness.

9. The flexible nose piece structure as defined in claim 1, wherein the filling elements are substantially flush with the respective outer side and front side of each nose piece body.

10. The flexible nose piece structure as defined in claim 1 wherein the base structure comprises a bridge forming a joint connecting the connector and the nose piece bodies, the bridge defining a concave bottom surface extending downwardly and divergently to the respective inner sides of the nose piece bodies.

11. The flexible nose piece structure as defined in claim 10 wherein the comfort piece comprises a central piece including a back pad positioned behind the bridge.

12. The flexible nose piece structure as defined in claim 10 wherein the comfort piece comprises a central piece including a front member attached to a front side of the connector.

13. The flexible nose piece structure as defined in claim 10 wherein the comfort piece comprises a central piece including a curved pad attached to the concave bottom surface of the bridge and smoothly connecting the nose pads.

14. A method of making a nose piece structure for eyewear, comprising steps of:
   a) molding a base structure in a first molding procedure using a first molding material, the base structure including a connector for attachment to a frame structure of the eyewear and a pair of nose piece bodies divergently and downwardly extending from the connector to a bottom end of the respective nose piece bodies, each of the nose piece bodies having opposed outer and inner sides extending between a front end and a rear end thereof, each of the nose piece bodies defining a plurality of first grooves on the outer side thereof and a plurality of second grooves on the front end; and
   b) molding a comfort piece in a second molding procedure using a second molding material, including molding the comfort piece onto the base structure to produce an integrated and inseparable one-piece component composed of the comfort piece and the base structure, including forming the comfort piece to have a pair of nose pads molded onto the inner sides of the respective nose piece bodies and a plurality of filling elements molded within and inseparable from the respective first and second grooves of each of the nose piece bodies, the second molding material in a cured condition being soft and flexible relative to the first molding material.

15. The method as defined in claim 14 wherein step (a) is performed in combination with a molding procedure for making a frame structure of the eyewear, the connector of the base structure being thereby integrated with the frame structure.

16. The method as defined in claim 15 wherein step (b) is performed with the presence of the integrated frame structure and the base structure.

17. The flexible nose piece structure as defined in claim 13 wherein the comfort piece comprises a central piece including a back pad extending upwardly from the curved pad, positioned behind and spaced apart from the bridge.

18. An eyewear comprising:
   a frame structure defining two opposed side ends and a central portion therebetween;

at least one lens attachable to the frame structure between the side ends; and a nose piece structure connected to the central portion of the frame structure, the nose piece structure comprising:

a base structure including a connector for attachment to a frame structure of the eyewear and a pair of nose piece bodies divergently and downwardly extending from the connector to a bottom end of the respective nose piece bodies, each of the nose piece bodies having opposed outer and inner sides extending between a front end and a rear end thereof, each of the nose piece bodies defining a plurality of first grooves on the outer side thereof and a plurality of second grooves on the front end thereof; and a comfort piece including a pair of nose pads molded to the inner sides of the respective nose piece bodies and a plurality of filling elements molded within the respective first and second grooves of each of the nose piece bodies to form an integrated and inseparable one-piece component composed of the comfort piece and the nose piece of the base structure, the comfort piece being soft and flexible relative to the base structure.

19. The eyewear as defined in claim 18, wherein the first and second grooves communicating with each other at a forward corner of each of the nose piece bodies, the forward corner extending between the outer side and the front end.

20. The eyewear as defined in claim 18, wherein the filling elements are substantially flush with the respective outer side and front side of each nose piece body.

* * * * *